Aug. 15, 1961   P. R. KEMBLE   2,996,214
EXPANSIBLE PLUG
Filed Feb. 8, 1960

INVENTOR
Percy R. Kemble

BY Q. Baxter Warner
Claude Funkhouser
ATTORNEYS

United States Patent Office 2,996,214
Patented Aug. 15, 1961

2,996,214
EXPANSIBLE PLUG
Percy R. Kemble, South Bend, Ind., assignor, by mesne assignments, to the United States of America as represented by the Secretary of the Navy
Filed Feb. 8, 1960, Ser. No. 7,498
5 Claims. (Cl. 220—24.5)

The present invention relates to a closure plug and more particularly to a novel expansible plug which provides a rigid yet uniform and unbroken closure surface suitable for cavities of large cross-section as well as openings of smaller cross-section.

For many years it has been well known in the mechanical arts to utilize expansible closure plugs to seal openings. Such devices may take a variety of forms, and although such devices have served the purpose, they have not proven entirely satisfactory under all conditions of service in that considerable difficulty has been experienced in adapting such conventional closure plugs for sealing openings of large diameter while still maintaining sufficient rigidity of the closure surface. Further difficulties have been encountered in that such closures are not necessarily permanent since they frequently become loosened in time by vibrational effects. Furthermore, whenever such plugs are utilized in airborne vehicles, it is of prime importance that the outer surfaces of such closure devices be maintained smooth and unbroken when sealing larger diameter orifices. The latter is essential to avoid the introduction of aerodynamic problems presented by an irregular or broken surface. Those concerned with the development of such closure plugs have long recognized the need for a closure device simultaneously obviating all of the above disadvantages of sealing plugs heretofor available. The present invention fulfills this need.

The present invention contemplates a novel expansible closure plug utilizing two members. The first member is deformable and has an outer convex spherical surface. The second member is non-deformable and is caused to bear against the inner surface of the first deformable member so as to deform the latter, thereby reducing the convexity of its outer spherical surface and causing the latter surface to expand in the lateral direction to effectively close the opening to be sealed. The resultant closure presents a smooth unbroken outer surface, especially suitable for such devices as guided missiles and the like having stringent aerodynamic requirements. Such closures have the added advantages of providing sufficient rigidity for large cross-section openings, and also of being permanent in that they will not be loosened by long term effects of vibration, since the second member remains in position after installation. The utilization of a threaded shaft, or the like, for drawing the two plug members together provides for considerably more precise tensile adjustment than could be obtained by distorting the spherical disc with a flattening tool, the latter deforming expedient often rendering it necessary to strike a number of blows to cause a distorted press fit between the plug and the opening to be sealed. Such closures have generally proven unreliable in that they frequently come loose with the passing of time.

An object of the present invention is the provision of an expansible plug providing a smooth unbroken closure surface.

Another object is to provide an expansible plug which will meantain sufficient rigidity for effectively sealing large cross-section openings as well as smaller orifices.

A further object of the present invention is the provision of an expansible plug which provides a permanent closure that will not be loosened by the effects of vibration.

Other objects and many of the attendant advantages of this invention will be readily appreciated as the same becomes better understood by reference to the following detailed description when considered in connection with the accompanying drawings wherein.

Figure 1:
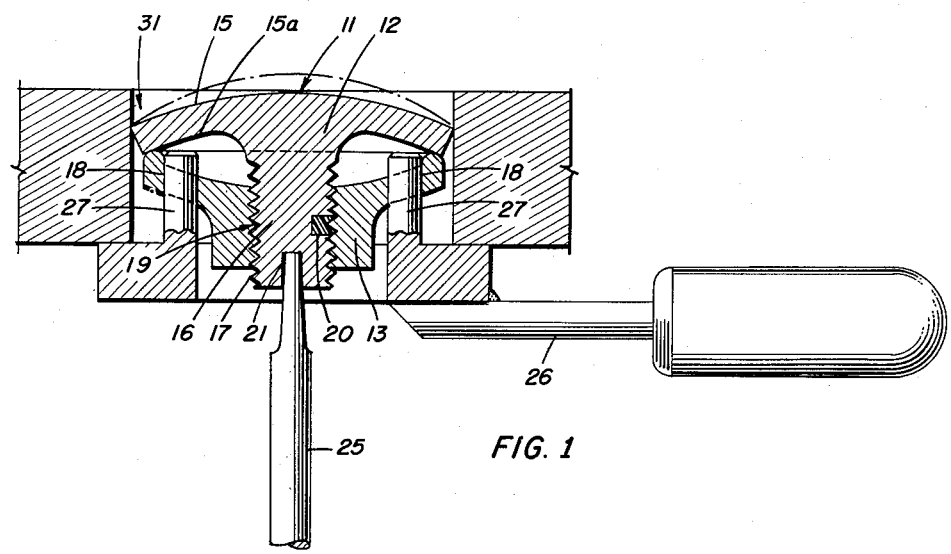
FIG. 1 is a sectional view showing the expansible plug of the instant invention and suitable tools in position for expanding the plug in an orifice to be sealed.
Figure 2:
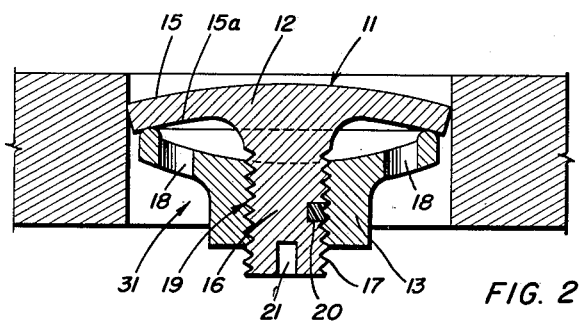
FIG. 2 is a sectional view of the expansible plug of FIG. 1 after installation has been completed.
Figure 3:
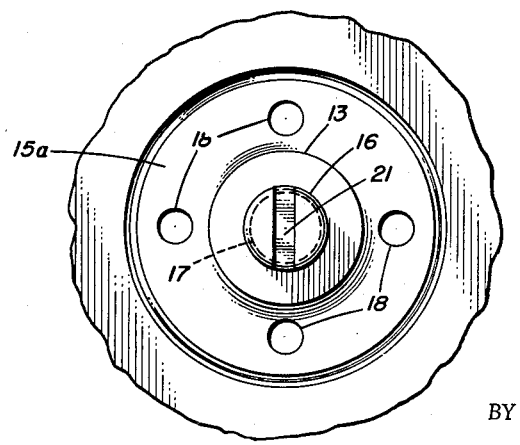
FIG. 3 is a bottom plan view of the expansible plug shown in FIG. 2.

Referring now to the drawings, wherein like reference characters designate like or corresponding parts throughout the several views, there is shown in FIG. 1, illustrating one embodiment of the invention, an expansible plug 11 inserted within the confines of an opening 31 to be sealed. The expansible plug 11 includes a spherically-shaped disc 12 having an outer convex surface 15 and an inner surface 15a which may or may not be concave. Integral with the spherically shaped disc 12 and extending from the inner surface 15a of the disc 12 is a shaft 16 having external threads 17 along its length. The spherically shaped disc 12 is of a soft material, which may be a metal or the like, that will take a permanent set. A second member 13 fabricated of a non-deformable material, such as case hardened steel or the like, is shown having a central hole carrying internal threads 19 for matching and engaging the threads 17 of the shaft 16 which depends from the spherically-shaped disc 12. A slot 21 is provided in the base of the shaft 16 and a plurality of holes or sockets 18 are provided in the member 13. The holes 18 and slot 21 are designed to receive tools 25 and 26, as shown in FIG. 1 of the drawings. The tool 25 engages the slot 21 of the shaft 16 to restrain the spherically shaped disc 12 against rotation. Simultaneously, tool 26 by its outer legs 27, engages the holes 18 in member 13 and enables the non-deformable member 13 to be rotated about the shaft 16 as an axis. The latter procedure causes members 12 and 13 to be drawn together so that disc member 12 is deformed and expanded laterally by reducing the convexity of its outer surface, thereby sealing off the opening 31. It is to be noted that the inner non-deformable member 13 is fabricated so that its diameter is slightly smaller than the diameter of the disc member 12, thus assuming that the forces exerted by the member 13 upon the deformable disc member 12 are always applied near the outer periphery of the disc member 12. Because of the location of the line of application of the latter forces, the resulting closure is extremely rigid. Furthermore, because the member 13 remains permanently in position after the deformation of the disc member 12 has been carried out, the resulting closure will not become loose with the passing of time due to long term vibrational effects. It is to be noted that the outer surface of the resulting closure is smooth and unbroken, the lateral expansion effecting proper sealing having been accomplished by "straightening" or reducing the convexity of the deformable disc member 12. The resultant smooth closure surface of the expansion plug of the instant invention is suitable for use in sealing aerodynamic surfaces, such as those commonly encountered in guided missiles, or the like.

A nylon insert 20 is provided for a small area of the threaded portion of the shaft 16 to increase friction and thereby prevent rotational slippage of the member 13 on shaft 16 after installation of the plug 11 has been completed. The provision of a threaded shaft for drawing the deformable and non-deformable members 12 and 13 together also allows for greater precision of tensile adjustment of the sealing medium, to insure correct torque specifications so that no buckling or damage occurs, either to the plug itself or to the surface being sealed. In this regard, the previously described disadvantages of using a flattening tool to install such closure surfaces are obviated.

Obviously many modifications and variations of the present invention are possible in the light of the above teachings. It is therefore to be understood, that within the scope of the appended claims, the invention may be practiced otherwise than as specifically described.

What is claimed is:

1. In a device of the type having a surface aperture to be closed with aerodynamic continuity and with vibration proof rigidity, an improved closure device comprising an expansible plug for sealing an opening, said plug consisting of a first deformable spherically shaped soft metal member having an outer unbroken convex surface and an inner concave surface, an externally threaded shaft integral with said first member and extending from the center of the inner concave surface of said first member, a second non-deformable member of a diameter not in excess of the diameter of said first member before deformation of said first member, said second member defining a plurality of socket holes in the surface thereof, said second member having a concave surface wherein is located a central internally threaded aperture adapted to receive the threaded shaft of said first member and shaped to engage said first member at the outer periphery thereof, a slot in said shaft of said first member, said slot in said first member and socket holes in said second member being adapted to receive tools for preventing the rotation of said first member while allowing free rotation of said second member about the shaft of said first member to thereby draw said first and second members together compressively and deform said first member to reduce the convexity of the outer surface thereof, and a nylon insert in the threads of said shaft to restrict rotation of said second member with respect to said first member after installation of the expansible plug is completed.

2. In a device of the type having a surface aperture to be closed with aerodynamic continuity and with vibration proof rigidity, an improved closure device comprising an expansible plug for sealing an opening, said plug comprising a first deformable spherically shaped disc member having an outer convex surface and an inner surface, an externally threaded shaft integral with said disc member and extending from the inner surface of said disc member, a second non-deformable member of a diameter smaller than said first member, said second member having therein an internally threaded hole adapted to receive the threaded shaft of said first member and shaped to engage said first member at its outer periphery, means on said first and second members to enable free rotation of said second member while said first member is restrained against rotation, and means in the threads of the shaft of said first member to restrict rotation of said second member with respect to said first member after installation of the expansible plug is completed.

3. In a device of the type having a surface aperture to be closed with aerodynamic continuity and with vibration proof rigidity, an improved closure device comprising an expansible plug comprising a first deformable soft metal member having an outer convex surface and an inner surface, an externally threaded shaft extending from the center of said first member, a second non-deformable member shaped to engage said first member at its outer periphery, said second member having therein a central internally threaded hole adapted to receive the threaded shaft of said first member, means enabling the free rotation of said second member while restraining rotation of said first member so that said first and second members may be drawn together compressively near the periphery of said first member, thereby smoothly deforming said first member to reduce the convexity of the outer surface thereof, and means for restricting rotation of said second member with respect to said first member after installation of the expansible plug is completed.

4. The device of claim 3 wherein said last-mentioned means consists of a nylon insert in the threads of the shaft of said first member.

5. In a device of the type having a surface aperture to be closed with aerodynamic continuity and with vibration proof rigidity, an improved closure device comprising an expansible plug comprising a first deformable member having an outer unbroken convex surface and an inner surface, an externally threaded shaft integral with said first member and extending from the inner surface thereof, a second non-deformable member having therein an internally threaded hole for engagement by said threaded shaft and shaped to engage said first member at its outer periphery, and means on said second member to receive a tool for rotating said second member with respect to said first member, so that said first and second members may be drawn together compressively to thereby deform said first member to reduce the convexity of the outer surface thereof.

References Cited in the file of this patent

UNITED STATES PATENTS

| | | |
|---|---|---|
| 400,272 | Traut | Mar. 26, 1889 |
| 2,579,845 | McWherter | Dec. 25, 1951 |
| 2,959,319 | Mitchell | Nov. 8, 1960 |